H. L. DOHERTY.
PURIFICATION OF GAS.
APPLICATION FILED MAY 22, 1917.

1,360,734.

Patented Nov. 30, 1920.
4 SHEETS—SHEET 4.

Inventor
Henry L. Doherty
By K. P. McElroy
Attorney

UNITED STATES PATENT OFFICE.

HENRY L. DOHERTY, OF NEW YORK, N. Y.

PURIFICATION OF GAS.

1,360,734.	Specification of Letters Patent.	Patented Nov. 30, 1920.

Application filed May 22, 1917. Serial No. 170,193.

*To all whom it may concern:*

Be it known that I, HENRY L. DOHERTY, a citizen of the United States, residing at New York, in the county of New York and State of New York, have invented certain new and useful Improvements in the Purification of Gas, of which the following is a specification.

This invention relates to the purification of gas; and it comprises a method of removing sulfureted hydrogen or carbon dioxid or both from natural gas contained in a line under pressure, and from other forms of compressed gas, without disturbance of the pressure wherein such gas is successively led past circulating bodies of ammoniacal water and of water in suitable scrubbing devices, such bodies continuously removed and fractionally distilled under suitable circumstances to remove sulfureted hydrogen or carbon dioxid, such sulfereted hydrogen or carbon dioxid being continuously discharged from the system, and to form ammonia vapors and water which are returned to the system at suitable points, all such operations being performed under the line pressure; and more particularly it comprises a process of removing sulfureted hydrogen from natural gas under line pressure wherein such gas is first progressively passed through water containing ammonia, is then mixed with ammonia and is finally passed in countercurrent against flowing water to take up escaping ammonia and wherein the water containing ammonia and sulfureted hydrogen is boiled to remove the sulfureted hydrogen, the ammonia and the water being thereafter returned to the scrubbing system to serve anew, all such operations being under such line pressure; and it also comprises as a new organization of apparatus elements a scrubbing system adapted to operate under high pressure in combination with a boiler system adapted to take liquids from such scrubbing system, and free them of ammonia and sulfureted hydrogen with suitable connections whereby the resulting water and ammonia may be returned to the scrubbing system while the sulfureted hydrogen is sent to exit; all as more fully hereinafter set forth and as claimed.

In the removal of sulfureted hydrogen from various gases containing both ammonia and sulfureted hydrogen, it has been found that the one impurity may be used to remove the other by the aid of various expedients. I have found that by an extension of this idea I may apply it to the purification of various gases which contain sulfureted hydrogen but which do not carry ammonia, such as a number of varieties of natural gas and I may also employ it for the removal of carbon dioxid from gases contaminated therewith. In so doing, I remove the sulfureted hydrogen or carbon dioxid by passing the gas through a scrubbing and purifying system containing a quantity of ammonia. This ammonia does not leave the system but remains therein for indefinitely long use. In dealing with natural gas, which is ordinarily under rather high pressure ranging up to 400 or 500 pounds per square inch, it is convenient to be able to remove sulfureted hydrogen without loss of pressure in the line. In the present invention I have devised a simple and continuous process of accomplishing this object; and I have also devised a simple and efficient type of apparatus susceptible of use in the stated process.

Sulfureted hydrogen is readily absorbed or dissolved by water containing ammonia to form ammonium sulfid. Carbon dioxid may be similarly absorbed to form ammonium carbonate. Ammonia, ammonium sulfid and ammonium carbonate are all volatile bodies; and when such a solution is heated high enough the gases are again expelled together with much of the ammonia. But by properly controlling temperatures and other circumstances, it is possible first to absorb $H_2S$ or $CO_2$ in an aqueous solution of ammonia and thereafter evaporate away the $H_2S$ or $CO_2$ at a somewhat higher temperature without much loss of ammonia. In other words, either $CO_2$ or $H_2S$ can be absorbed by the solution at one range of temperatures and again expelled at another; the ammonium sulfid or carbonate, as the case may be, is dissociated and the gases removed while the ammonia stays behind. Such ammonia as is carried forward in this action can be recovered by scrubbing the $H_2S$ or $CO_2$ with water under proper conditions. And I have found it is possible to perform this fractionation or separation even at pressures as high as 400 or 500 pounds per inch although it would be a natural supposition that such high pressures would restrain the liberation of gas on heating the solution.

This fact I utilize in the present invention, which though primarily intended for the removal of sulfureted hydrogen may equally well be applied to the removal of carbon dioxid. I shall however hereinafter speak more specifically of sulfureted hydrogen with the understanding that the present invention may also be applied to $CO_2$.

In the present invention I provide some type of scrubbing system adapted to withstand high pressures while permitting an intimate contact of a scrubbing liquid with the gas. This scrubbing system I provide with suitable inlets and outlets so as to permit the use of different liquids at different points in the scrubbing system. The gas to be purified is led through the scrubbing system in such a manner that it first meets an ammonia solution to take out sulfureted hydrogen and subsequently meets a current of water to remove any ammonia vapors which may have gone forward with the gas after contact with such solution. In a desirable embodiment of my invention, the main part of the purification is performed in a middle part of the scrubbing system by a special current of ammoniacal liquor passing in cyclic circulation through a boiler in which the $H_2S$ is removed for expulsion from the system. Beyond this middle part, the natural gas is scrubbed with water to pick up the volatilized $NH_3$ going forward with such gas. The scrubbing water is then bypassed around such middle part and brought into contact with the natural gas current flowing to such middle section. The gas is here rich in $H_2S$. The liquid is next sent to a still and the ammonia (together with absorbed $H_2S$) sent to rejoin the liquor in the middle part of the scrubbing system while the residual water is returned for service in scrubbing outgoing gas to recover $NH_3$ going forward. A portion of this water may be used to scrub the $H_2S$ expelled from the ammoniacal liquor and recover the $NH_3$ carried away thereby. In other words, there are two main cyclic circulations; one of ammoniacal liquor serving to extract $H_2S$ and a second of water to recover volatilized ammonia, the ammonia so recovered in the second circulation being returned to the first circulation.

The $H_2S$ removed and expelled is in a substantially pure state and may be sent to waste or utilized in any way that may be desired, as by burning it to produce $SO_2$ and sulfuric acid, fractionally burning it to recover sulfur, etc. Advantageously it may be passed through iron oxid to oxidize the $H_2$ and liberate sulfur in the free state. If the purifier apparatus containing iron oxid be kept at a moderate heat the liberated sulfur will flow away from the purifier in a melted condition.

In the accompanying illustration I have shown more or less diagrammatically an advantageous assemblage of apparatus elements within the present invention and adapted for use in performing the described process. In this showing, Figure 1 is a view in front elevation of a suitable apparatus for the present purposes, showing the complete system and the circulation;

Fig. 5 is a detail view of the structure of Fig. 3, being a cross section on line $x$—$x$.

Figure 1:
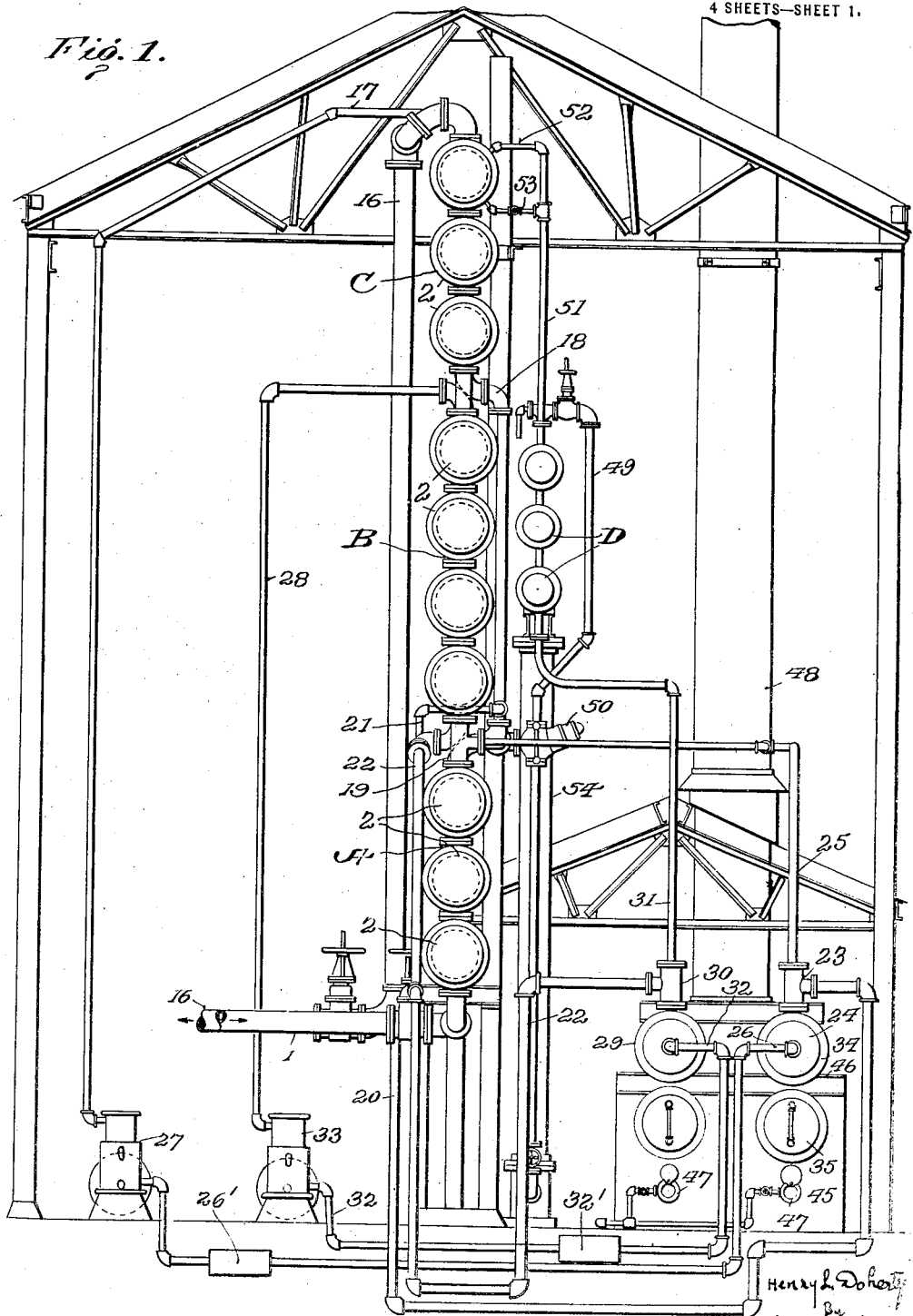
Figure 3:
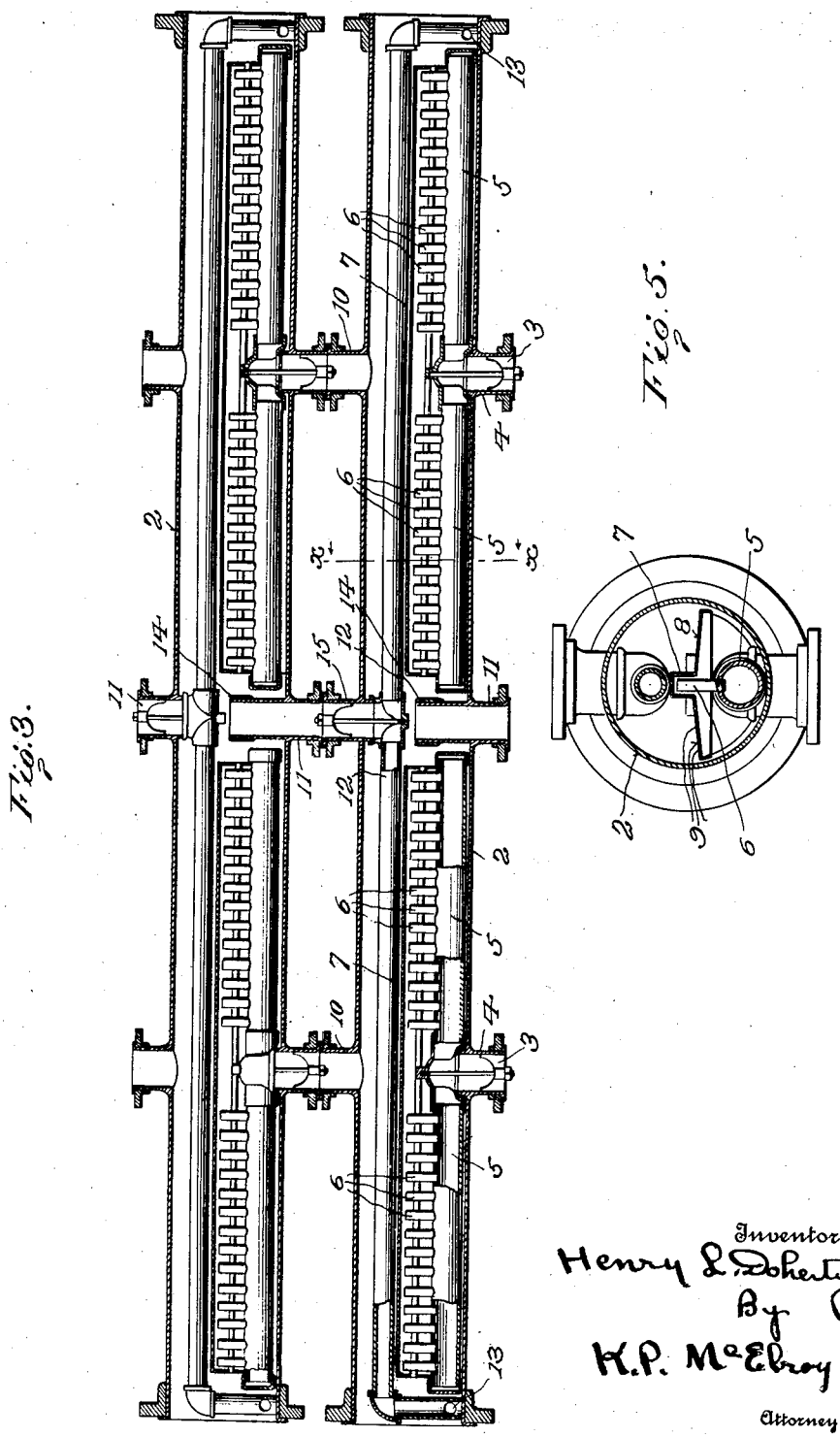
Fig. 3 is a detail view in vertical longitudinal section showing the structure of the particular scrubbing devices used.

Referring first to Fig. 1, gas to be purified enters under the line pressure through pipe 1 and passes upward through a plurality of scrubbing devices 2. Ten of these scrubbing devices are shown divided into three groups, A, B and C. B group is the intermediate section hereinbefore referred to and serves for the scrubbing with ammoniacal liquor while group C serves for scrubbing with water to recover escaping ammonia. The structure of these devices may be more clearly understood by referring to Fig. 3 which shows two of these scrubbers in vertical longitudinal section. Gas enters each scrubbing device at inlets 3 through pipes 4 communicating with distributing pipes 5. These pipes are provided with upward extensions or nipples 6. As may be seen from Fig. 5 these upward extensions enter a sort of longitudinal dome 7 rising from perforated plate 8. This perforated plate is about midway the height of the casing of the scrubbing device. The gas accumulates in this dome and passes through orifices 9 in the stated plate as a plurality of minute bubbles. After passing through the liquid it accumulates in the top of the scrubbing casing and passes up to the next through outlets 10 communicating with the inlet pipes (4) thereof. Liquid flows downwardly from scrubbing casing to scrubbing casing through outlets 11 which pass downward from each upper casing into the next casing and communicate with two pipes 12 extending on each side of the inlet. As shown, these pipes have a downward extension 13 giving a liquid seal at a point near the base of the scrubbing casing, and beyond the ends of the distributing pipes. Liquid flowing in through these pipes accumulates in the scrubbing casing until it covers the perforated plate just described and overflows at 14 to pass into the next scrubbing casing below. As will be seen, the gas going into one scrubbing casing is bubbled through liquid therein as minute bubbles, accumulates in the top of the casing, and goes to the next one above for repassage through the liquid while the liquid is flowing in countercurrent through the scrubber system.

Returning now to Fig. 1 the natural gas passes upward through the ten scrubbing devices shown and finally goes to exit at 16. As shown, water (coming from a circulating system hereinafter described) enters the top scrubbing device at 17 and passes downward successively through the three scrubbers of group C, and is then bypassed by means of 18 around the scrubbers of group B, entering group A at 19. It then passes downward through group A to exit at 20. Instead of going through group A it may be bypassed therearound through valved conduit 21 and enter discharge line 20. The liquid which is successively passed through group C and group A, having been bypassed around group B, goes to the inlet 23 of a boiling or evaporating device 24 shown in section in Fig. 4. This inlet 23 also serves as exit for vapors of ammonia, $CO_2$ and $H_2S$ which pass through 25 to join the natural gas passing up through group B. The liquid from which the ammonia and $H_2S$ have been boiled off leaves this evaporating device through 26, is sent through a cooler 26' and returns by means of pump 27 to furnish the water entering at the top of the scrubbing system (through pipe 17). Through the scrubbers of group B an independent circulation of ammoniacal liquor is established. Liquor enters these scrubbers through pipe 28 and flows progressively downward therethrough against the upwardly flowing natural gas to be purified, incidentally taking up also the ammoniacal vapors from the boiling device just described. At the bottom, charged with the $H_2S$ and ammonia it passes to exit through a discharge line 22. By this discharge line it is sent to another evaporator 29 which in structure is exactly the same as the boiling device just described (as 24), entering at 30. This inlet 30 also serves as an exit for the vapors and gases here produced which are mainly $H_2S$ and water vapor and which pass away through $H_2S$ discharge line 31. In this evaporation temperatures and conditions are so controlled as to expel acid gases ($H_2S$ and $CO_2$) without much loss of ammonia, the ammonia remaining in the liquor for reuse. Passing through this evaporating device the ammoniacal liquor emerges at 32 and is sent past cooler 32' by pump 33 back to the inlet for group B previously described (28). As will be noted, there are two independent liquid circulations so far described. In one (group B) the gas is treated with ammoniacal liquor and this liquor is then freed of acid gases and returned. The other serves mainly (in group C) to pick up and recover the ammonia escaping from group B, this ammonia then being boiled off and returned to group B.

Figure 4:
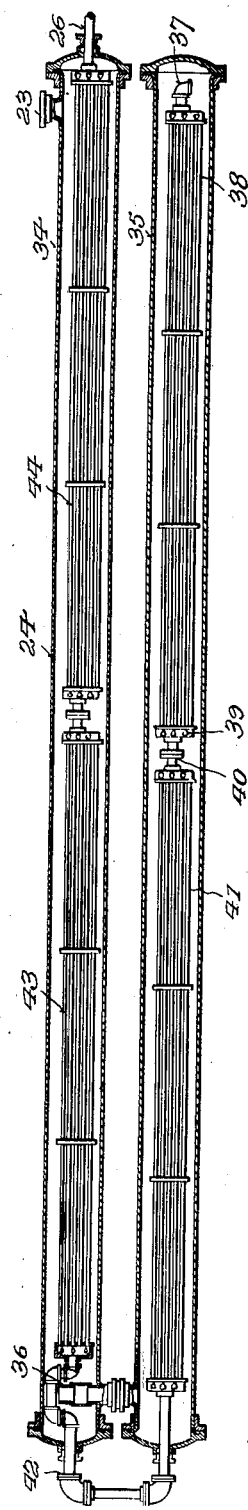
Fig. 4 is a partial longitudinal vertical section of certain distilling and evaporating bodies shown at the right and bottom of Fig. 1.

Referring now to Fig. 4, there may be seen a central longitudinal section of the two evaporating devices referred to; that for boiling off recovered ammonia and that for removing acid gases. As the two are exactly alike in structure this section may be considered to be either taken along 24 or 29. The reference numerals are those used on boiling device 24. As shown this device is composed of two casings 34 and 35 mounted in superimposed relationship. The two casings are in liquid communication at 36 so that liquid accumulating in the upper casing can overflow at 36 and enter the lower casing. Liquid so entering and overflowing into the lower casing passes longitudinally therethrough until it reaches the inlet 37 of a tube system 38 extending to header 39, thence through 40 to the header of another tube system 41. Passing through 41 the liquid flows by means of bypass 42 to a pair of similar tube systems 43 and 44 in the upper casing and thence goes to exit through a pipe previously described (26). Returning now to Fig. 1, the lower casing of each evaporating device is mounted within a furnace chamber 45 having an arch 46 between the upper and lower casings. Heat is provided by burner 47 passing into the furnace chamber while waste gases are removed through stack 48.

Figure 2:
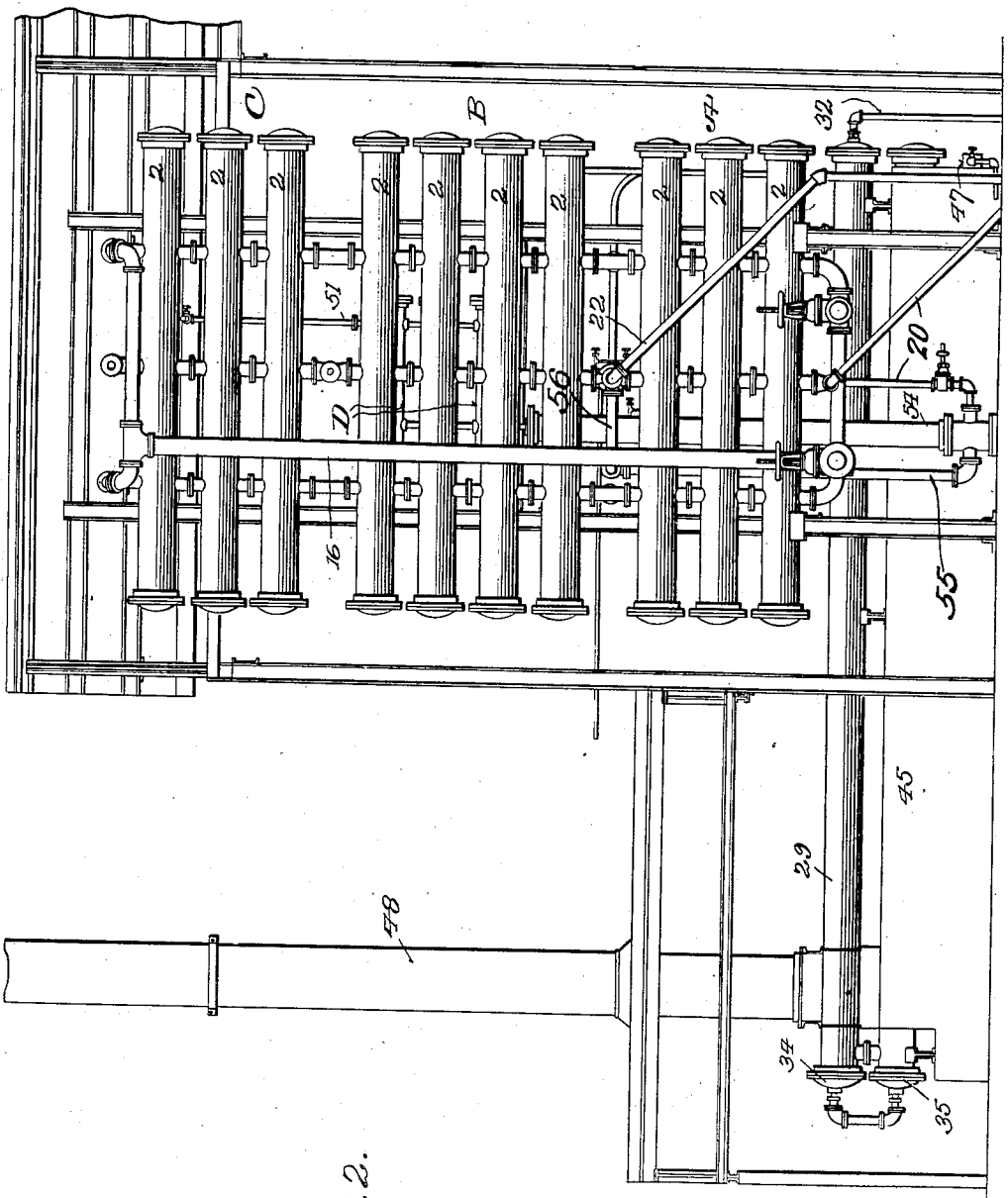
Fig. 2 is a side elevation of the structure of Fig. 1 seen from the right.

The $H_2S$ removed by the $H_2S$ discharge line (31) passes upward into a group of three scrubbers intended to remove residual ammonia therefrom, and forming group D. These scrubbers although smaller are the same in structure as those of groups A, B and C previously described. The $H_2S$ passes up through these scrubbers of group D in a countercurrent against water flowing downward therethrough and finally goes to exit through pipe 49 leading to escape valve 50 which may be loaded to any pressure desired. This $H_2S$ scrubber, like the rest of the apparatus, operates under the line pressure of the gas, less of course such differential in pressure as may be due to the height of the various water columns. It is supplied with water from pipe 51 tapped into the uppermost scrubber of group C at 52 and 53. By suitable adjustment of the valve in 53 any desired amount of water may be allowed to flow down through the scrubbing system. The water coming from the base of the $H_2S$ scrubber system goes into well 54 whence it passes upwardly through a pipe 55 to a cross pipe 56 (Fig. 2) where it enters the upper scrubber of group A and commingles with the liquid flowing down through the scrubbers A and passes out through the pipe 20 to the first evaporating device 24.

In the use of the foregoing structure gas enters at 1 and passes upward through the system to exit at 16 under whatever pressure may be prevailing. In going up through the scrubbers of group C it is deprived by the water entering at 17 of any ammoniacal vapors which may have gone forward from groups B and A. This water charged with ammonia goes through 18 into group A where it absorbs some $H_2S$ from the entering gas and moistens the gas prior to its entry into B. This liquor now containing both ammonia and sulfureted hydrogen, passes into the still 24 through inlet 23. Through this still it flows from one end of the top casing and overflows into the lower casing through which it passes to the other end. In going through both casings it is freed of ammonia and sulfureted hydrogen which escape as vapors at 23 and go through 25 into the scrubbers of group B. No attempt is here made to separate ammonia from acid gases, everything that is more volatile than water being boiled off. The function of the circulation is to restore to B ammonia escaping from B, and the acid gases are sent along with it to join those which the liquor in B is collecting. The liquid freed from volatile matters goes through 37 and the pipe systems described to exit at 26, whence it is returned to 17, a minor proportion passing through 53 and 51 down through the $H_2S$ scrubbing system (group D) to recover ammonia therein. The current of ammoniacal liquor from group B carrying with it the absorbed acid gases goes to still 29 through which it flows in the manner just described for 26, the liquor freed of acid gases finally escaping at 32 and going back to the scrubbers of group B for service anew. In 29 the liquid is freed of its $H_2S$ and $CO_2$ without loss of much ammonia. This $H_2S$ carrying a little ammonia goes up through the scrubbers of group D where the ammonia is removed and returned by the scrubbing water while the $H_2S$ and $CO_2$ which are now pure escapes through 50 to any point of use or disposal.

The described apparatus will of course remove either carbon dioxid or sulfureted hydrogen or both.

What I claim is:—

1. The process of removing acid gases from high pressure natural gas and other gas under high pressure without disturbing such pressure which comprises scrubbing said gas under such pressure with a flowing body of water and ammonia, removing the scrubbing liquor, heating the liquor to expel absorbed acid gases, removing ammonia from said acid gases and returning it to the liquor, cooling the liquor and returning the liquor and contained ammonia into scrubbing contact with said gas in closed cycle.

2. The process of removing acid gases from high pressure natural gas and other gas under high pressure without disturbing such pressure which comprises scrubbing said gas under such pressure with a flowing body of water and ammonia, removing the scrubbing liquor, heating the liquor to expel absorbed acid gases, cooling the liquor, returning the liquor into scrubbing contact with said gas in a closed cycle, and washing the gas after such scrubbing contact with a flowing current of water, such current after such washing being removed, heated to expel ammonia, cooled and returned for recontact, the ammonia expelled in such heating being transferred to the first stated body of water and ammonia.

3. The process of freeing natural gas of acid impurities such as sulfureted hydrogen and carbon dioxid without disturbing its pressure, which comprises scrubbing such gas under line pressure with a body of water and ammonia, heating the body under like pressure to expel absorbed acid impurities, cooling the liquid and returning it to scrubbing contact, washing the scrubbed gas with water to recover volatilized ammonia, heating the wash water to expel the recovered ammonia, transferring the expelled ammonia to the first named body, cooling the wash water, and returning the major portion of it to contact with the gas, washing the expelled acid impurities with the minor portion of water and reuniting such minor portion with the major portion of water coming from the washing operation prior to the described heating operation.

4. The process of removing sulfureted hydrogen from natural gas passing through gas lines under high pressure without disturbance of such pressure which comprises passing such gas through a scrubbing system under such pressure, contacting such gas in the last portion of its passage with a flowing current of water, by-passing such current around an intermediate portion of the gas passage into contact with the incoming gas, removing the water and heating it to expel ammonia, returning the evolved ammonia vapors to the gas in such intermediate portion, cooling the heated water and returning it to contact with the gas to serve as the stated flowing current, contacting with the gas in such intermediate passage another flowing aqueous current to take up such ammonia and the sulfureted hydrogen, heating such current after contact to expel the sulfureted hydrogen, removing the sulfureted hydrogen from the system and cooling and returning the said other aqueous current to said intermediate portion; all such operations being conducted under line pressure.

5. The process of removing sulfureted hydrogen from natural gas passing through gas lines under high pressure without disturbance of such pressure which comprises passing such gas under such pressure through a suitable scrubbing system wherein it is contacted with ammonia and with a plurality of aqueous currents flowing in closed cycles through said scrubbing system and through evaporating systems, one such current being water which contacts with said gas just prior to its exit to remove residual ammonia, said current being thereafter heated to expel such ammonia and furnish such water and the expelled ammonia being returned to the other current, said other current flowing in contact with the gas before it reaches the water current, thence flowing through a heater for expulsion of sulfureted hydrogen, and thence returning for renewed contact with the gas.

6. The process of removing sulfureted hydrogen from natural gas passing through gas lines under high pressure without disturbance of such pressure which comprises passing such gas through a scrubbing system maintained under the line pressure and establishing and maintaining a plurality of aqueous currents each circulating in closed cycle through such scrubbing system and through an evaporating system, the evaporating systems also being at the line pressure, one such current being at the time of its initial contact with the gas substantially free of ammonia and another being rich in ammonia, the first stated current after removal from contact with the gas being heated to expel absorbed ammonia and being then returned for new contact while the second stated current after a period of contact with the gas is heated to expel absorbed H$_2$S and is then returned for fresh contact, the ammonia expelled from the first stated current being returned to the gas at the point of contact with the second stated current.

7. The process of removing sulfureted hydrogen from natural gas passing through gas lines under high pressure without disturbance of such pressure which comprises bubbling said gas under line pressure through a plurality of countercurrents of aqueous scrubbing liquid, the same body of liquid furnishing the last and the first scrubbing contact experienced by the gas and another body of liquid rich in ammonia furnishing an intermediate scrubbing contact, and heating each body of liquid to expel vapors therefrom, the heated liquid being then cooled and returned for renewed contact, returning the vapors expelled from the first stated body of liquid to the gas at the point of contact with the second stated body and removing from the system the vapors expelled in heating the second stated body of liquid, said vapors prior to removal being scrubbed with a portion of the cooled liquid from the first stated body which portion, after such scrubbing, is returned to the circulation of such first stated body.

8. A purifying plant for removing sulfur from natural gas comprising a scrubber system adapted to withstand high pressures, connections for leading gas to and from said scrubbing system, means for scrubbing the gas in passage through said scrubbing system by a plurality of currents of circulating liquid, means for removing each of said currents, heating to expel vapors, cooling and returning to the scrubbing system, means for returning vapors expelled in heating one such liquid back to the scrubbing system and means for discharging vapors evolved in another heating operation.

9. In an apparatus for treating gas, a number of scrubbing devices connected for continuous circulation of gas therethrough, means for circulating a flowing current of aqueous liquid through certain of said devices and means for circulating another current of liquid through certain other of said devices, means for heating the first stated liquid and expelling vapors therefrom, means for cooling the heated liquid and returning the same to the scrubbing device, means for heating another of said liquids and expelling vapors therefrom, and means for cooling and returning the heated liquid back to the scrubbing device.

10. In a high pressure scrubber for removing acid gases from gas under high pressure, such as natural gas, the combination of a series of scrubbing elements arranged in three groups, a plurality of liquid heating devices, cooling devices, and means for circulating liquids from one such group through one such heater, one such cooler and back to the same group and means for circulating another current of liquid from another group to another such heater and cooler and back to the same group.

11. In a natural gas scrubber, a tubular scrubber having an inlet on its lower side, a horizontal inner tube communicating therewith, a series of nipples projecting from such tube, a dome plate surmounting such nipples and perforated at points below the dome and means for introducing scrubbing liquid from above to a level submerging the perforations.

12. In a gas scrubber, a horizontal tubular scrubbing device, an entrance for liquid from above and water sealed pipes leading such liquid to the bottom of the casing, an overflow for such liquid about midway the height of the casing, a horizontal gas pipe lying at a somewhat lower level than said outlet, projecting upward nipples from said gas pipe, and a scrubber plate having a dome extending above such nipples and lateral extensions below the normal liquid level, such latter extensions being perforated.

13. In a gas scrubber, a series of horizontal tubular scrubbers, connections for sending gas upward through the series from bottom to top successively, means for introducing a flow of scrubbing liquor through an intermediate group in said series, means for removing the liquor passing through such group, means for heating the liquor to expel absorbed gases therefrom, means for cooling the heated liquor and means for returning the liquor to the same group, means for passing water through the last group in series after the treatment just described, means for heating the water to expel absorbed gases therefrom, means for transferring the expelled gases to the first stated intermediate group, means for cooling the heated liquid and means for returning it to the group from which it came.

14. In a gas scrubber, a plurality of horizontal scrubbing elements adapted to withstand high pressure and arranged in three groups, two boiling devices, means for transmitting liquid through an intermediate group and thence to one of said boiling devices, means for expelling from the system gases and vapors liberated in said boiling device, means for returning the liquid from said boiling device to said intermediate group, means for supplying liquid to the last group in series, means for transferring the liquid passing therethrough around the intermediate group to the first group through which gas passes, means for removing the liquid from the last stated group, means for heating it to expel absorbed gases, means for returning the expelled gases to the intermediate group and means for cooling and returning the heated liquid back to the group whence it came.

15. In apparatus for treating natural gas, a series of scrubbers adapted to operate under high pressure, a plurality of boiling devices adapted to operate under the same pressure, means for cyclically circulating liquid through one of said groups and one of said boilers, means for circulating another body of liquid through another group and the other boiler, means for removing and washing the gases expelled in the first evaporating device and means for returning to the first stated cyclically circulating liquid the gases expelled in the second evaporating device.

16. In a natural gas scrubbing device having means for cyclically circulating liquid in scrubbing contact with said gas and through a boiling device for removing gases or vapors absorbed in such scrubbing, a boiling device comprising a pair of shells connected at one end, heating means for one of said shells, means for introducing liquid into one such shell at the other end, an inner tubular structure in each shell, said tubular structure communicating with the interior of the other shell at the end removed from the point of communication between the two shells, a by-pass between the two tubular structures at the communicating end of such two shells and an outlet for liquid at the end of the shell wherein liquid is introduced into such shell.

17. In a scrubber for removing acid gases from combustible gas under high pressure without disturbance of such pressure, a plurality of strong-walled scrubbing devices arranged in series and each provided with means for intimate contact of liquid with such gas therein, a pair of evaporators adapted for work under high pressure, connections for returning exhausted liquid from one evaporator to the scrubber last receiving gas, connections for returning gases and vapors from said evaporator to another scrubber nearer the end of gas inlet, connections for returning exhausted liquor from the second evaporator to scrubbers at or near the point of gas inlet, another series of scrubbers, connections for transmitting gases and vapors liberated in the second evaporator through such other series and thence to release, and connections for transmitting a portion of the exhausted liquid from the first named evaporator through such other series of scrubbers and thence back to the same evaporator.

18. In a gas purifying apparatus, a plurality of scrubbers arranged for successive treatment of gas, two evaporating devices, pipe connections for delivering exhausted liquid from each of said evaporators to a scrubber, pipe connections for leading the gases and vapors from one such evaporator out of the system, pipe connections for leading back the vapors and gases from the other evaporator to the scrubber receiving exhausted liquid.

19. The process of removing acid gases from foul gases under high pressure without disturbance of such pressure, which comprises circulating ammoniacal liquor in a closed cycle; circulating water in a closed cycle; successively scrubbing such gas under pressure with said liquor and said water in a portion of their respective cycles; thereafter heating said liquor to a temperature at which the major portion of the acid gases will be driven off while retaining the major portion of the ammonia, and heating said water to boiling to drive off ammonia; and returning the ammonia removed from said water circuit to said liquor circuit.

In testimony whereof I affix my signature hereto.

HENRY L. DOHERTY.